United States Patent [19]

Malmborg

[11] Patent Number: 5,688,397

[45] Date of Patent: Nov. 18, 1997

[54] COMBINATION BOTTLE CAP AND FILTER

[76] Inventor: Rick Malmborg, 5390 Canyon Crest Dr., San Ramon, Calif. 94583

[21] Appl. No.: 463,963

[22] Filed: Jun. 5, 1995

[51] Int. Cl.[6] ................................................ B01D 27/02
[52] U.S. Cl. .......................... 210/136; 210/266; 210/282; 222/189.06
[58] Field of Search .............................. 210/136, 266, 210/282, 464, 469, 472; 222/146.6, 185.1, 189.06

[56] References Cited

U.S. PATENT DOCUMENTS

| | | | |
|---|---|---|---|
| 4,024,991 | 5/1977 | Tyson et al. | 222/189 |
| 4,145,291 | 3/1979 | Console et al. | 210/232 |
| 4,695,379 | 9/1987 | Nohren et al. | 210/282 |
| 4,972,976 | 11/1990 | Romero | 222/185.1 |
| 4,995,975 | 2/1991 | Jacquot et al. | 210/266 |
| 5,139,666 | 8/1992 | Charbonneau et al. | 210/264 |
| 5,173,192 | 12/1992 | Shalev | 210/767 |
| 5,200,070 | 4/1993 | McMenamin | 210/282 |
| 5,238,559 | 8/1993 | Nieweg | 210/264 |
| 5,417,860 | 5/1995 | Kay | 210/472 |
| 5,431,813 | 7/1995 | Daniels | 210/472 |
| 5,486,285 | 1/1996 | Feeney | 222/189.06 |

Primary Examiner—Ivars Cintins
Attorney, Agent, or Firm—Harris Zimmerman

[57] ABSTRACT

A combination bottle cap and filter cartridge for use with a reservoir water bottle includes an outer sidewall having a generally cylindrical configuration and an end wall joined to the outer edge of the sidewall. The sidewall is dimensioned to be received about the mouth and neck of the bottle. A cylindrical filter cartridge extends from the cap end wall and is disposed concentrically within the sidewall. The filter cartridge includes an inner end wall disposed within the bottle neck, and a curved inner panel extends from the inner end wall to the cap end wall to define two chambers within the cartridge. A filter chamber contains a charge of granulated filter medium. A plurality of holes are formed in the inner end wall and the cap end wall to admit water from the bottle to the filter cartridge and discharge water therefrom, respectively. A pair of fiber scrims are interposed in the filter chamber between the inner and outer end walls and the filter medium to retain the granulated particles therein. The other chamber within the cartridge comprises a tubular air passage, with an inlet port extending through the cap end wall and an outlet port extending through the inner end wall. A check valve is disposed within the air passage to admit air through the passage to the bottle and prevent discharge of water therethrough.

24 Claims, 4 Drawing Sheets

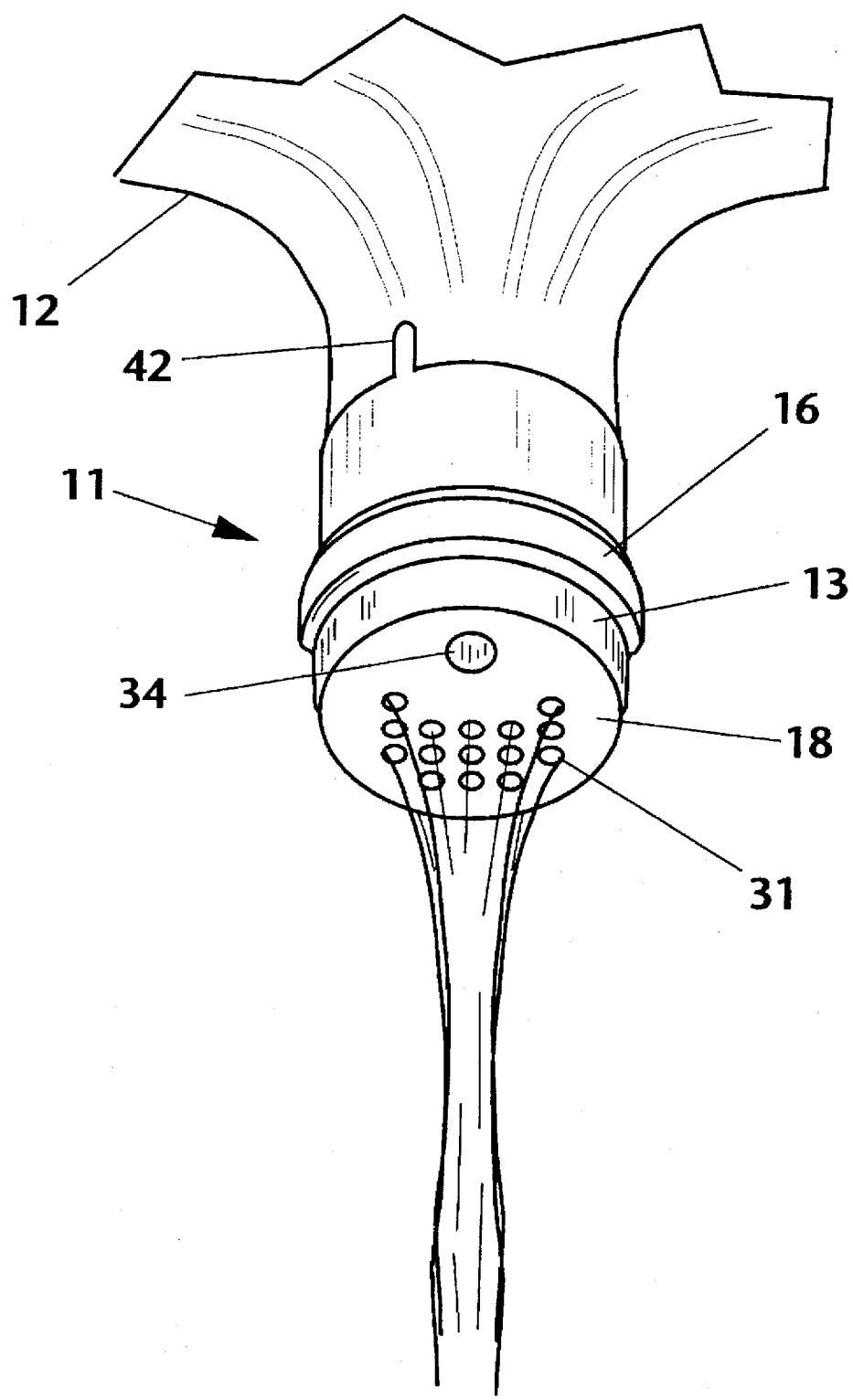
Figure_1

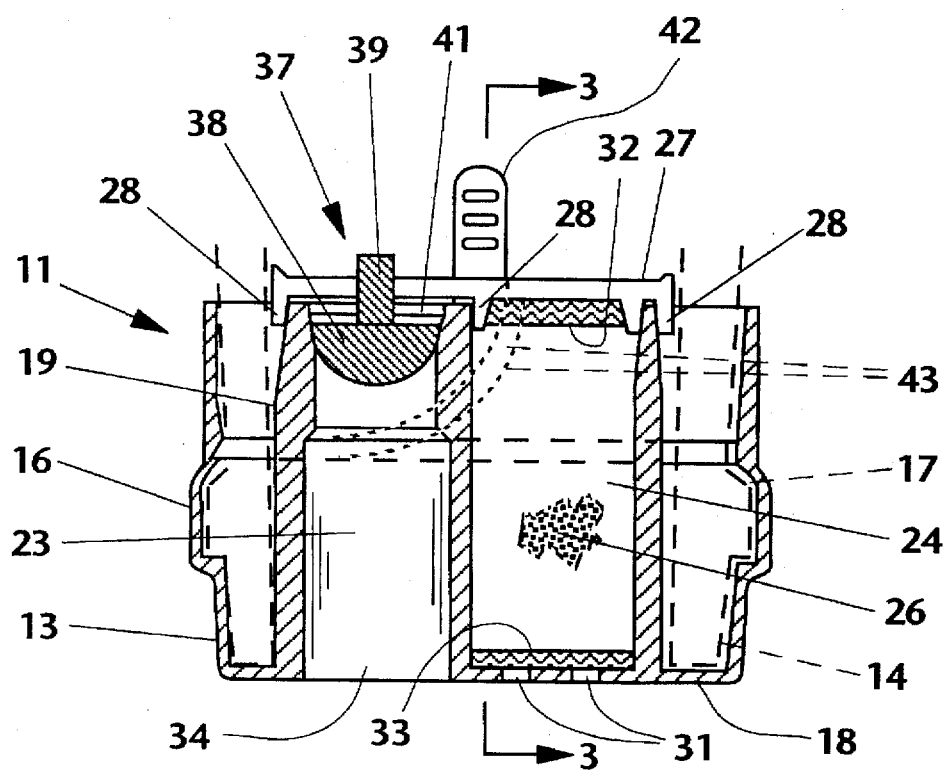
Figure_2
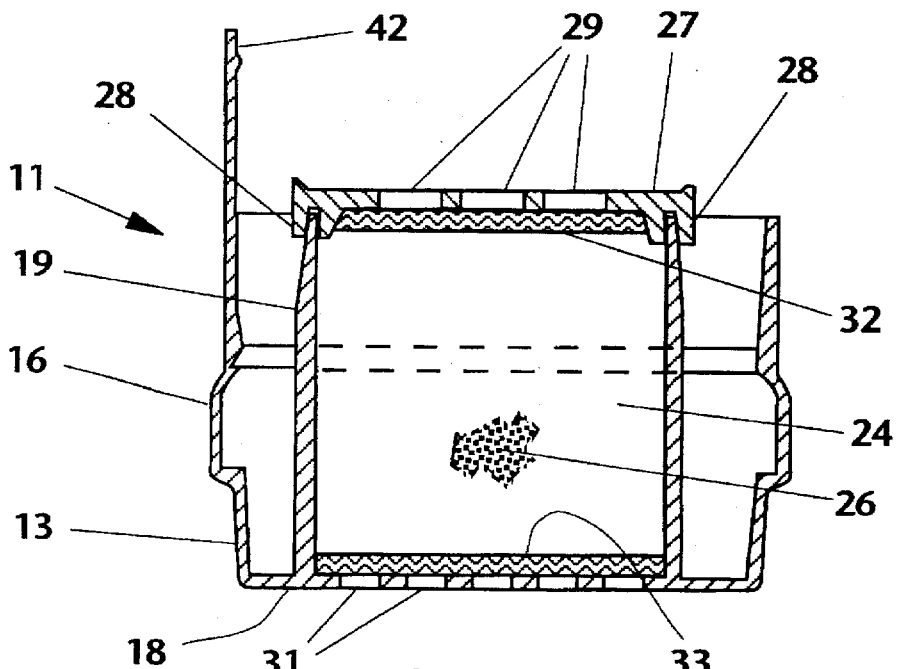
Figure_3

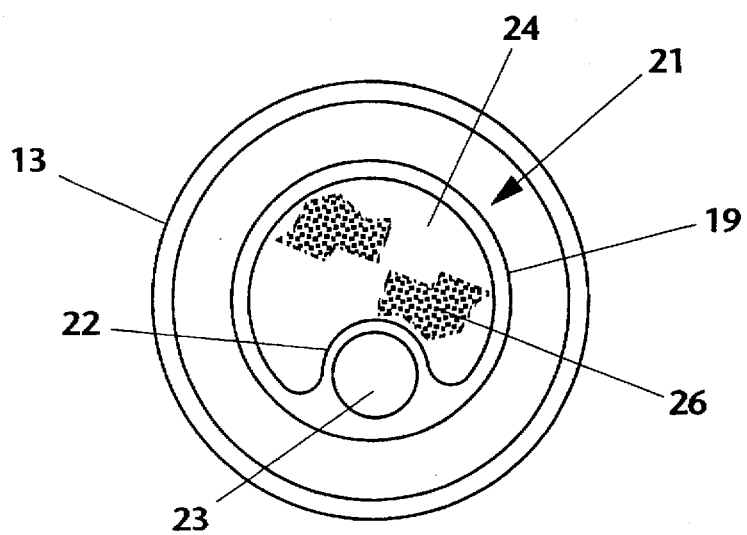
Figure_4
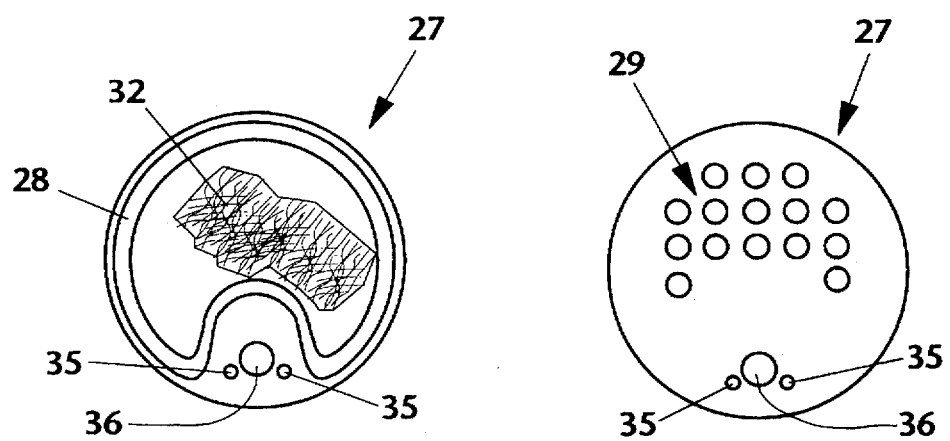
Figure_5    Figure_6
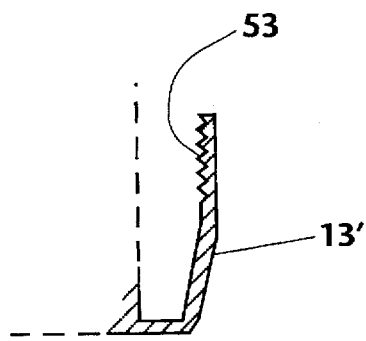
Figure_8

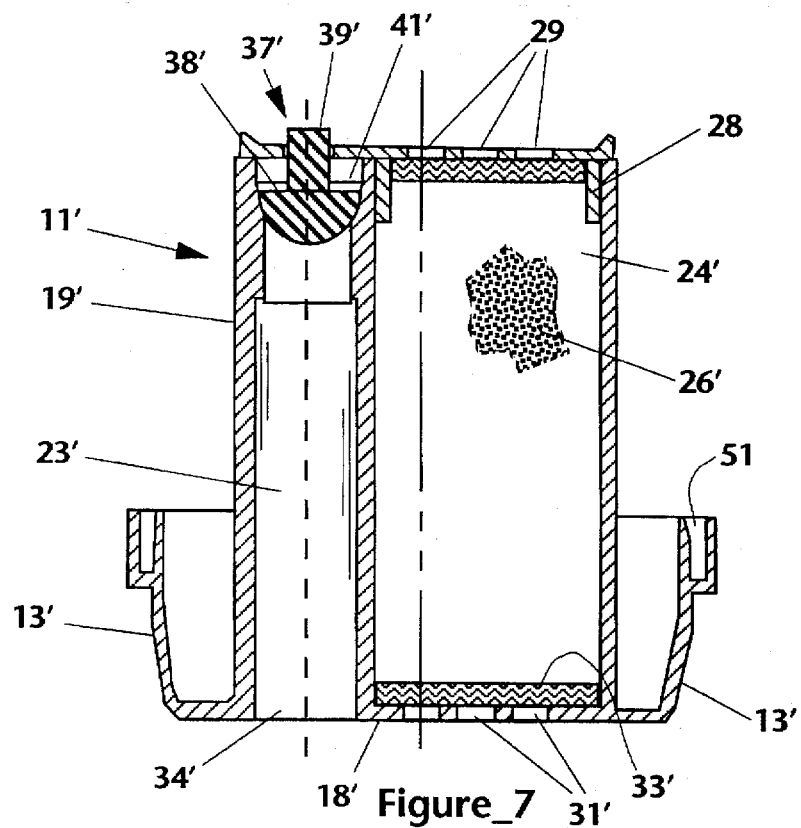
Figure_7
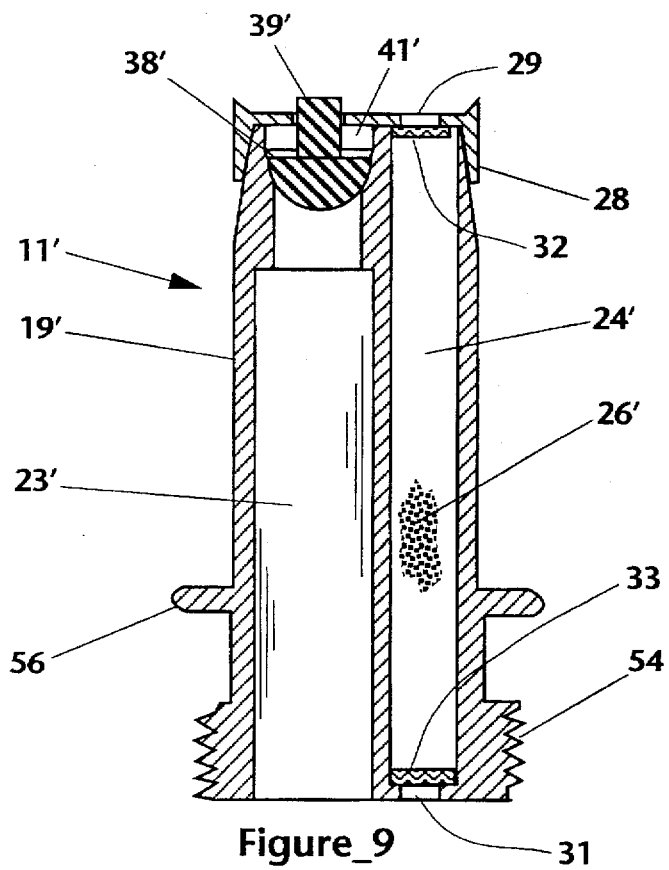
Figure_9

COMBINATION BOTTLE CAP AND FILTER

BACKGROUND OF THE INVENTION

This invention relates to water supply systems, and more particularly to large water bottle reservoirs for dispensing drinking water at the point of consumption.

In the last century most cities have constructed municipal water systems to supply water for domestic, industrial, and commercial use. Paradoxically, in this same time period the business of selling bottled water for human consumption has grown enormously. Although most municipal water companies collect and purify water to meet minimum standards for purity, turbidity, and biological contamination, it is a fact that many municipal water supplies do not meet commonly accepted personal standards of taste and purity for comestible use. For example, many water supplies have a high mineral content (hardness), and although this factor does not preclude the use of the water for most uses, it imparts a taste that is objectionable to many customers. Likewise, recent regulations promulgated by the United States Environmental Protection Administration have required many municipal systems to carry out chlorination using hypochlorite rather than gaseous chlorine. The result has been that some consumers perceive the taste of the water as similar to swimming pool water. It is not cost effective to treat municipal supplies to remove objectionable mineral content and other dissolved substances that cause offensive taste.

Surprisingly, despite the strong chlorine taste of some municipal water supplies, it has been found that the chlorine treatment is not sufficient to destroy all of the active organisms in the water. Some municipal systems have been contaminated with giardia lambdia and cryptosporidium, causing widespread illness to the utility customers. Thus many water company customers have turned to bottled water from seemingly pure sources to obtain drinking water, although they still use the municipal water for washing, laundry, irrigation, and the like.

Bottled drinking water is generally dispensed in a large, standardized bottle, typically having a capacity of three, five, or six gallons. These bottles are usually used in conjunction with a dispenser that supports the bottle in an inverted disposition, with the mouth of the bottle immersed in a small supply tank that feeds a dispensing valve. Water cooling or heating devices may be added to the dispenser. Generally, the large water bottles are returned after emptying to the supply company for cleaning and refilling.

Assuming that the water within a large supply bottle may be pure when delivered to a dispenser, the purity may be compromised when the bottle is opened and placed in the dispenser. As the bottle is drained, ambient air bubbles into the bottle to occupy the volume of the dispensed water. The ambient air contains bacteria and spores of molds and other organisms that may thrive within the tepid water of the bottle reservoir. If the bottle remains in the dispenser for more than a few days, there is an opportunity for the organisms to multiply sufficiently impart an offensive taste to the water, and there is also a chance that disease organisms may flourish and cause illness.

Bottled drinking water may originate from spring water sources, or it may derive from municipal water supplies. In the former case, spring or well sources are usually located far from an appropriate processing plant location, and must be transported to a processing plant for bottling. The latter is generally filtered and processed to improve the taste and purity and fulfill the customer's expectations, and then bottled in a fairly aseptic container to protect these qualities. In both cases, the bottles are then shipped to a distribution point, and again shipped to the customer's premises. The primary cost factor in this enterprise is not the raw material or the purification process; rather, it is the shipping of relatively heavy containers of a substance having a rather low value density factor (cost per pound of material), and the collection and return of the empty containers adds to the cost. It is apparent that a more optimum method of delivering pure drinking water to a customer would be to filter the water at the premises, and eliminate the shipping cost entirely. Indeed, many water filter devices are currently available for reasonable cost. These devices are generally used by connecting them to a faucet or tap, which becomes the designated source for drinking water. Unfortunately, the faucet or tap is usually used to supply water for other purposes, such as cooking or washing, resulting in rapid use of the filtering capacity of the device for purposes that do not require filtered water. Moreover, most consumers do not replace the filter element according to the schedule recommended by the manufacturer, and the quality of the water gradually declines. Thus these devices have not enjoyed great commercial success.

There remains an unmet need among the public for pure, filtered water obtainable on demand at low cost.

SUMMARY OF THE PRESENT INVENTION

The present invention generally comprises a combination bottle cap and filter cartridge adapted to be used with a reservoir water bottle to deliver high purity water to a consumer. A salient feature of the invention is that the water contained in the bottle is filtered as it is dispensed, whereby water having taste or purity factors that are objectionable is transformed into pure drinking water. Another salient feature is that the combination bottle cap and filter cartridge may be discarded when the bottle is emptied and replaced with a fresh filter. The bottle may be refilled with tap water or equivalent.

In one aspect the invention comprises a bottle cap assembly dimensioned for use with a standard water reservoir bottle, such as the typical three, five, or six gallon bottle. The bottle cap assembly includes an outer sidewall having a generally cylindrical configuration and an end wall joined to the outer edge of the sidewall. The sidewall is dimensioned to be received about the mouth and neck of the five gallon bottle. An annular shoulder is formed in the sidewall to conform to an annular flange of the bottle to secure the cap assembly about the bottle neck and form a leakproof seal.

A generally cylindrical filter cartridge extends from the cap end wall and is disposed concentrically within the sidewall. The filter cartridge includes an inner end wall disposed within the bottle neck, and a curved inner panel extends from the inner end wall to the cap end wall to define two chambers within the cartridge. A filter chamber contains a charge of filter medium, such as granulated activated charcoal or other surface adsorbent, silver salt or other bactericide, water softening agents, or other water treatment agents known in the prior art. A plurality of holes are formed in the inner end wall and the cap end wall to admit water from the bottle to the filter cartridge and discharge water therefrom, respectively. A pair of woven or non-woven fiber scrims are interposed in the filter chamber between the inner and outer end walls and the filter medium to retain the granulated particles therein, and to strain any large particles out of the water flow therethrough. Alternatively, a plurality of very small holes in the inner and outer end walls may serve to retain the filter medium while permitting flow through the cartridge.

The other chamber within the cartridge comprises a tubular air passage, with an inlet port extending through the cap end wall and an outlet port extending through the inner end wall. The air passage admits air to the bottle to displace water dispensed therefrom. It may be appreciated that all water output from the bottle passes through the filter cartridge, and contaminants are removed from the water by the filter medium during discharge of the water.

The tubular air passage occupies a significantly smaller volume of the cartridge than the filter chamber. A check valve is disposed within the air passage to admit air through the passage to the bottle and prevent discharge of water therethrough. The check valve includes a valve element having a hemispherical head disposed in a outwardly tapering portion of the air passage. The element translates inwardly in the tapering portion to admit air, and moves outwardly to seal the passage and prevent outward water flow through the passage.

The bottle cap and filter cartridge assembly is secured about the neck of a full bottle of water. The bottle may be inverted and supported in a typical prior art water dispenser, and the pure water discharged through the filter chamber is dispensed upon demand. The outer sidewall is provided with a partially perforated tearaway strip, so that the bottle cap and filter cartridge assembly may be removed from the bottle opening after the contents have been exhausted. Thereafter, the bottle may be refilled, and a new cap and filter assembly reinstalled in the bottle opening, and the bottle may be reused indefinitely in this fashion.

In another aspect of the invention, the bottle cap and filter cartridge assembly is constructed fundamentally as described above, with the exception that the assembly is dimensioned to be used with a bottle having a mouth defined by a thin rim. The outer sidewall of the cap is configured with a free edge having a snap-engaging edge feature. The cap snap-engages with the rim of the bottle mouth, and the cartridge is received within the neck portion of the bottle. As before, the bottle cap and filter cartridge assembly is removable after the bottle contents are completely discharged, and the bottle is reusable. Alternatively, the free edge of the cap sidewall may be provided with a female threaded portion to engage a bottle having a threaded neck.

In a further aspect of the invention, the bottle cap and filter cartridge assembly is constructed fundamentally as described above, with the exception that the assembly is provided with a narrow configuration adapted to be received within an internally threaded bottle neck. The outer sidewall is eliminated; rather, the outer peripheral surface of the filter cartridge is provided with external threads that match the external threads of the bottle neck. This feature permits the bottle with the invention to be mounted in the same dispenser receptacle that is designed to receive the bottle, or to permit the bottle with the invention to be capped with a threaded bottle cap. In addition, a flange extends radially and continuously about the cartridge to facilitate handling and insertion.

BRIEF DESCRIPTION OF THE DRAWING

FIG. 1 is a perspective view showing the bottle cap and filter cartridge assembly of the invention secured to a water reservoir bottle.

FIG. 2 is a cross-sectional elevation of the bottle cap and filter cartridge assembly of the invention, showing the air passage and filter chamber.

FIG. 3 is a cross-sectional elevation of the bottle cap and filter cartridge assembly of the invention, taken along line 3—3 of FIG. 2.

FIG. 4 is an end view of the inner end of the bottle cap of the embodiment shown in FIGS. 1–3.

FIG. 5 is a plan view of the inner end cap of the filter cartridge of the invention.

FIG. 6 is a plan view of the obverse side of the end cap shown in FIG. 5.

FIG. 7 is a cross-sectional elevation of a further embodiment of the bottle cap and filter cartridge assembly for use with a snap-engaging bottle mouth.

FIG. 8 is a partial cross-sectional elevation of another embodiment of the invention, showing an adaptation for bottles having external threaded mouth connections.

FIG. 9 is a cross-sectional elevation of a further embodiment of the bottle cap and filter cartridge assembly for use with a threaded bottle neck.

DESCRIPTION OF THE PREFERRED EMBODIMENT

The present invention generally comprises a combination bottle cap and filter cartridge adapted to deliver high purity water to a consumer from a reservoir bottle filled with non-purified water.

With regard to FIGS. 1–4, one embodiment of the invention includes a combination bottle cap and filter cartridge assembly 11 adapted to be secured to a standard water reservoir bottle 12, commonly provided in a range of two to six gallons and typically three, five, and six gallon capacities, used to supply water to water dispensers and coolers in domestic and business settings. The assembly 11 is secured to the mouth and upper neck portion of the bottle 12 to filter the water discharged therefrom, and is adapted to be removed and discarded when the bottle is emptied. The bottle may then be refilled and a fresh assembly 11 replaced on the bottle. Thus a clean new filter is added to the bottle with each new charge of water therein, assuring optimal purification of the water.

With regard to FIGS. 2–4, the bottle cap and filter cartridge assembly 11 includes an outer sidewall 13 having a generally cylindrical configuration that circumscribes the neck 14 of the bottle. An annular shoulder 16 in the sidewall 13 is provided to engage the annular flange 17 typically provided on the bottle neck 14, whereby the assembly 11 is secured to the bottle 12 in leakproof fashion. An outer end wall 18 extends across the outer edge of the sidewall 13. An inner sidewall 19 is disposed concentrically within the outer sidewall 13 and extends integrally from the inner surface of the end wall 18. The inner sidewall 19 defines a filter cartridge 21 that is received within the opening of the bottle neck 14 in close tolerance fit, so that all water discharged from the bottle must pass through the filter cartridge.

A curved inner panel 22 extends from the outer endwall parallel to the axis of the cylindrical sidewall 19. The panel 22 defines therewithin a tubular air passage 23. Furthermore, defined between the sidewall 19 and the panel 22 is a filter chamber 24 containing a charge of filter medium 26, such as, for example, granulated activated charcoal or other surface adsorbent, silver salt or other bactericide, water softening agents, or other water treatment substances known in the prior art. A cartridge end cap 27 is provided to seal the inner end of the cartridge 21. The end cap 27 includes a flange 28 configured to snap-engage the end edges of the sidewall 19 and the curved panel 22 to enclose the filter chamber 24. A plurality of holes 29 extend through the end cap 27 to the filter chamber 24 to admit water thereto, and a similar array of holes 31 extend through the end wall 18 to the filter chamber to discharge water therefrom. A scrim 32 formed of woven or non-woven fiber is secured within the flange 28 and interposed between the holes 29 and the filter medium 26 to retain the granulated filtering material, and to strain any large particles out of the water flow therethrough. A similar scrim 33 is interposed between the filter medium 26 and the holes for similar purposes. The scrims 32 and 33 are held in place by the compression of the filter medium that fills the chamber. Alternatively, the holes 29 and 31 may be provided as a greater number of very small diameter openings that permit water flow while preventing loss of the filter medium, and the scrims may be eliminated.

The end wall 18 also includes an air intake port 34 communicating with the tubular air passage 23, and the end cap 27 is provided with air outlet ports 35 and an opening 36 connecting to the air passage 23. The tubular air passage is provided to admit air to the water bottle 12 to displace the water discharged therefrom, thereby preventing a vacuum lock that would inhibit water discharge. The air passage 23 is provided with a check valve to permit air inflow only, and to prevent water outflow through the passage 23. A check valve element 37 includes a hemispherical head 38 disposed in a flared portion 41 of the passage 23, and a stem 39 extending from the element 37 through the opening 36. Air flowing into the passage 23 through port 34 impinges on the head 38, urging the valve element 37 toward the opening 36 and providing a flow space between the head 38 and the flared portion 41 that permits air flow through air outlet ports 35 into the bottle. The diameter of the ports 35 control air inflow into the bottle, thus controlling the water discharge rate from the bottle. Water pressure exerted on the stem 39 and the adjacent surface of the head urges the head 38 to impinge on the flared portion 41 of the passage and form a seal therewith, thus preventing outflow of water thereby.

The bottle cap and filter cartridge assembly 11 further includes a tearaway feature that permits the assembly 11 to be removed from the bottle neck when the bottle has been emptied. A pull tab 42 is formed integrally with the outer sidewall 13, extending from the edge thereof opposed to the end wall 18. A pair of partially perforated tear lines 43 extend from the side of the pull tab 42 in generally parallel, arcuate fashion to join the base of the annular shoulder 16. The tear lines 43 define an intentionally weakened portion of the sidewall 13, and are designed so that the pull tab 42 may be grasped manually and pulled away from the sidewall to initiate a tear in the sidewall. Continued tension on the tab 42 extends the tear to the annular shoulder 16 and further thereabout. When the tear is extended approximately one-half of the circumference of the sidewall, the entire assembly 11 may be removed and discarded. Thereafter, the bottle may be refilled, and a new cap and filter assembly 11 reinstalled in the bottle opening, and the bottle may be reused indefinitely in this fashion. It may be appreciated that the discarded assembly 11 cannot easily be reinstalled, due to the tearaway release feature, thus discouraging re-use of a filter assembly with a new charge of water in the bottle.

A filled bottle bearing an assembly 11 in accordance with the invention may be handled and shipped with the addition of a cover secured over and about the assembly 11 to prevent contamination of the device by dust and dirt. The cover may be fabricated of paper or plastic film. Alternatively, an empty bottle may be filled at a point of sale or use, and an assembly 11 secured to the bottle before the bottle is installed in a water dispenser.

A further embodiment of the invention, shown in FIG. 7, includes many of the features and components of the embodiment of FIGS. 1-4 which are labeled with similar reference numerals having a prime (') designation. The primary distinction of the embodiment of FIG. 7 is that the sidewall 13' is foreshortened in the axial direction, and the free edge of the sidewall is provided with an annular channel or groove 51 opening in the axial direction. The assembly 11' is dimensioned to be used with a bottle having a thin rim circumscribing the mouth, and the annular channel 51 is dimensioned to snap-engage the thin rim to secure the assembly 11' to the bottle in removable fashion. The filter cartridge 21' forms a slip fit in the mouth of the bottle, and the snap-engaged groove 51 forms a leakproof seal, so that all water discharged from the bottle must pass through the filter medium in the cartridge 21. As before, the bottle cap and filter cartridge assembly is removable after the bottle contents are completely discharged, and the bottle is reusable.

With regard to FIG. 8, the embodiment of FIG. 7 may be further modified by eliminating the annular channel or groove 51, and substituting therefore an internally threaded portion 53. The threads 53 are adapted to engage external threads commonly provided on a wide range of bottles, so that the invention may be used in conjunction with many screw-cap type bottle closures. Included in this category are bottle configurations typically used for packaging soft drinks, juice, carbonated beverages, and the like, as well as some forms of water cooler reservoir bottles.

Another embodiment of the invention, shown in FIG. 9, includes many of the features and components of the embodiment of FIGS. 1-4 which are labeled with similar reference numerals having a prime (') designation. The fundamental distinction of this embodiment is that the outer sidewall is eliminated completely, so that only the filter cartridge 21' remains. The cartridge 21' is provided with an externally threaded portion 54 adapted to match external threads formed on the neck of a bottle. This feature permits the bottle with the invention to be mounted in the same dispenser receptacle that is designed to receive the bottle, or to permit the bottle with the invention to be capped with a threaded bottle cap. In addition, a flange 56 extends radially outwardly and continuously about the sidewall 19' to facilitate handling and insertion of the cartridge 21', which is retained by a leakproof, friction fit in the bottle neck. An example of a bottle used with this embodiment is a typical two liter soda bottle.

All of the embodiments of the invention disclosed herein may be fabricated of plastic, polymer, resin, or the like, preferably molded in unitary and integral fashion to the greatest extent possible. The bottles with which the invention is used may be formed of glass, plastic, polymer, or metal. The embodiments described with reference to FIGS. 7-9 are not necessarily destroyed by the process of removing them from the water bottle after the bottle is emptied. These assemblies may be discarded in favor of new assemblies 11' which provide fresh filtering medium. Alternatively, the embodiments of FIGS. 7-9 may be constructed to be renovated by removing the filter medium 26' and the scrims 32' and 33', cleaning the emptied assembly, and adding new filtering material to reconstitute the purification capacity of the assembly. Indeed, any of the embodiments described herein may be reused multiple times before either being discarded or refilled for reuse.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

I claim:

1. A combination bottle cap and filter assembly for use with a bottle having a mouth opening and neck, including;
   a filter cartridge dimensioned to be received in the mouth opening and neck of the bottle;
   a charge of water filtering material disposed within said filter chamber;
   an outer sidewall circumscribing a portion of the neck of the bottle and securing said assembly to said bottle;
   end wall means joining said filter cartridge and said outer sidewall, and
   tearaway strip means formed in said outer sidewall for opening a portion of said outer sidewall and releasing said assembly from the bottle and preventing reinstallation of the assembly on a bottle.

2. A combination bottle cap and filter assembly for use with a bottle having a mouth opening and neck, including;
   a filter cartridge dimensioned to be received in the mouth opening and neck of the bottle, said filter cartridge including a closed curved inner sidewall;
   a filter chamber disposed within said inner sidewall and adapted to permit flow of water from the bottle through said filter chamber to be discharged from the mouth of the bottle;
   a charge of water filtering material disposed within said filter chamber;
   an air inlet check valve disposed within said inner sidewall and adapted to permit flow of air into the bottle; and,
   means for releasably securing said assembly to the bottle.

3. The combination bottle cap and filter assembly of claim 2, wherein said means for releasably securing said assembly includes an outer sidewall circumscribing a portion of the neck of the bottle.

4. The combination bottle cap and filter assembly of claim 3, wherein said outer sidewall further includes a proximal edge having a snap-engaging rim means adapted to snap-engage a portion of the bottle.

5. The combination bottle cap and filter assembly of claim 3, wherein said outer sidewall further includes a proximal edge portion having female threads for engaging an externally threaded portion of the bottle neck.

6. The combination bottle cap and filter assembly of claim 2, wherein said inner sidewall is disposed concentrically within an outer sidewall.

7. The combination bottle cap and filter assembly of claim 6, further including a distal end wall extending continuously across a distal edge of said outer sidewall.

8. The combination bottle cap and filter assembly of claim 7, wherein said inner sidewall extends from said distal end wall.

9. The combination bottle cap and filter assembly of claim 8, further including an end cap secured to a proximal edge portion of said inner sidewall, said end cap and said distal end wall defining a sealed filter chamber within said cartridge.

10. The combination bottle cap and filter assembly of claim 9, further including air passage means in said filter cartridge to admit air to the bottle to displace water dispensed therefrom.

11. The combination bottle cap and filter assembly of claim 10, wherein said air passage means includes a curved panel disposed within said inner sidewall and defining with said inner sidewall a tubular passage extending between said distal end wall and said end cap.

12. The combination bottle cap and filter assembly of claim 11, further including an air intake port extending through said distal end wall to said tubular passage, and an air outlet port extending through said end cap to said tubular passage.

13. The combination bottle cap and filter assembly of claim 12, wherein said air inlet check valve is disposed within said tubular passage to direct air flow from said intake port to said outlet port.

14. The combination bottle cap and filter assembly of claim 13, wherein said air inlet check valve includes a portion of said tubular passage flaring toward said end cap, and a valve element secured within said flared portion of said tubular passage.

15. The combination bottle cap and filter assembly of claim 14, wherein said valve element includes a head portion having an arcuate, flared configuration complementary to said flared portion of said tubular portion.

16. The combination bottle cap and filter assembly of claim 15, further including a stem extending from said head portion through said outlet port.

17. The combination bottle cap and filter assembly of claim 2, wherein said means for releasably securing said assembly includes an externally threaded portion of said filter cartridge adapted to match external threads formed in the bottle neck, whereby said combination bottle cap and filter assembly may be secured along with the bottle neck in a threaded receptacle adapted to receive the external threads of the bottle neck.

18. The combination bottle cap and filter assembly of claim 17, further including a flange extending radially from said filter cartridge and formed continuously thereabout, said flange facilitating handling and insertion of said combination bottle cap and filter assembly in a bottle neck.

19. A combination bottle cap and filter assembly for use with a bottle having a mouth opening and neck, including;
   a filter cartridge dimensioned to be received in the mouth opening and neck of the bottle;
   a charge of water filtering material disposed within said filter chamber; and
   means for releasably securing said assembly to the bottle during use of said filter cartridge and means for removing said assembly from the bottle when said filter cartridge is expended, said means for removing including tearaway strip means for releasing said assembly from the bottle.

20. The combination bottle cap and filter assembly of claim 19, wherein said tearaway strip means is operable to remove said means for releasably securing said assembly to the bottle, whereby reinstallation of the assembly on a bottle is prevented.

21. A combination bottle cap and filter assembly for use with a bottle having a mouth opening and neck, including;
   a filter cartridge dimensioned to be received in the mouth opening and neck of the bottle, said filter cartridge disposed substantially entirely within the neck of the bottle;
   means for releasably securing said assembly to the bottle;
   said filter cartridge including an inner sidewall disposed concentrically within an outer sidewall, a distal end wall extending continuously across a distal edge of said outer sidewall, said inner sidewall extending from said distal end wall;

an end cap secured to a proximal edge portion of said inner sidewall, said end cap and said distal end wall defining a sealed filter chamber within said cartridge;

a charge of water filtering material disposed within said filter chamber;

a plurality of water inlet holes extending through said end cap to said filter chamber, and a plurality of water outlet holes extending through said end wall to said filter chamber.

22. The combination bottle cap and filter assembly of claim 21, further including a pair of fiber scrims disposed between said filter material and said water inlet and water outlet holes.

23. The combination bottle cap and filter assembly of claim 21, wherein said plurality of water inlet holes and water outlet holes are dimensioned to permit water flow therethrough and prevent passage of said filter medium therethrough.

24. A combination bottle cap and filter assembly for use with a bottle having a mouth opening and neck, including;

a filter cartridge dimensioned to be received in the mouth opening and neck of the bottle, said filter cartridge disposed substantially entirely within the neck of the bottle;

a charge of water filtering material disposed within said filter chamber;

means for releasably securing said assembly to the bottle;

means for releasably securing said assembly including an outer sidewall circumscribing a portion of the neck of the bottle;

at least one partially perforated line formed in said outer sidewall to define a tearaway strip therein, and a pulltab extending from said outer sidewall in registration with said tearaway strip.

* * * * *